M. RUBIN,
Assignor to L. SANDERS.
Fan.
No. 9,159. Reissued April 13, 1880.
Fig: 1.
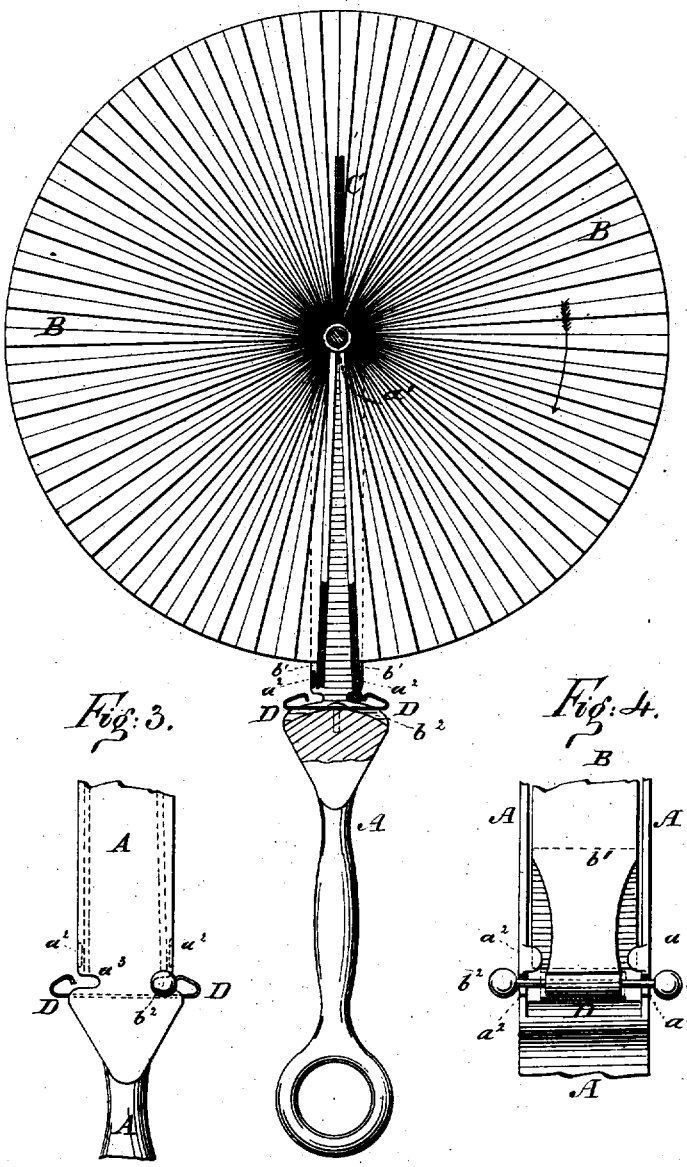
Fig: 2.
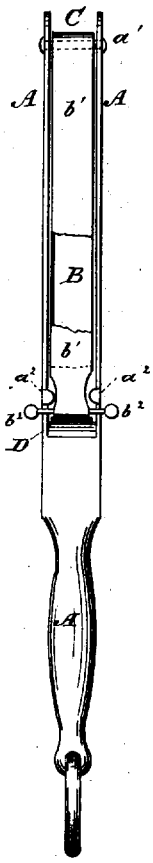
Fig: 3.
Fig: 4.
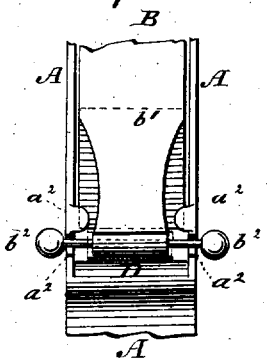
WITNESSES:
Carl Harp
Otto Pirsch
INVENTOR
Max Rubin
By Paul Goepel
ATTORNEY
N. PETERS, PHOTO-LITHOGRAPHER, WASHINGTON, D. C.

UNITED STATES PATENT OFFICE.

MAX RUBIN, OF NEW YORK, N. Y., ASSIGNOR TO LOUIS SANDERS.

FAN.

SPECIFICATION forming part of Reissued Letters Patent No. 9,159, dated April 13, 1880.

Original No. 220,427, dated October 7, 1879. Application for reissue filed January 3, 1880.

*To all whom it may concern:*

Be it known that I, MAX RUBIN, of the city of New York, in the county and State of New York, have invented certain new and useful Improvements in Fans, of which the following is a specification.

The object of this invention is to furnish an improved fan of that class in which the fan portion proper may be spread out or opened into circular form and returned or folded into a forked portion of the handle, and by which it is held securely in place in open or closed position.

The invention consists of a forked handle, to the ends of which is connected a fan by a center pivot, around which it swings from one side to the other into open or closed position. The fan is provided with end plates, which are fitted into the forked portion or case of the handle. One of these end plates is provided with a cross-head at the outermost end, which cross-head is retained by fastening devices at the base of the forked portion on either side of the handle. Both side plates of the forked handle have inwardly-bent lips to retain one end plate of the fan, while the other recessed end plate is free to pass out or into the case. The side plates of the case are notched below the lips to receive the cross-head and allow the recessed end plate of the fan to pass in between the side plates of the case.

In the accompanying drawings, Figure 1 represents a side view of my improved fan, being shown in open position and with a part cut away to show the construction. Fig. 2 is an end view of the same closed; and Figs. 3 and 4 are detail views, showing the fastening devices by which the fan is held in open or closed position on the handle.

Similar letters of reference indicate corresponding parts.

A represents the handle of the fan, the upper part of which is forked, the space formed between the side plates of the forked portion or case being of sufficient width to receive the folded fan B.

The fan B is made of paper or any other material employed in the manufacture of fans, and laid, in the usual manner, in plaits or folds of a width a little less than the width of the space between the side plates of the case. The last fold at each side of the fan is strengthened by an end plate, $b'$, of wood, sheet metal, or other suitable material.

The folds of the fan are held together at the center by a cord or other suitable fastening device passed through them.

To the middle folds of the fan is secured a thin strip or plate, C, of metal, leather, or other material, which is bent into the shape of an eye or sleeve, that is applied to a fixed cross-pin, $a'$, near the outer ends of the side plates of the forked portion. The cross-pin forms the pivot around which the fan swings in opening or closing.

The side plates of the forked portion A are provided with stops or lips $a^2$, which project inwardly at right angles thereto, the lips being arranged just above the base of the forked portion. These lips serve to retain one of the end plates, $b'$, of the fan within the forked portion and prevent it from passing out at either side thereof. The outer part of the other end plate, $b'$, is cut away or recessed at both sides, as shown in Fig. 4, so that it can readily pass the lips at either side of the handle, the end plate being extended below the lips and provided with a cross-head, $b^2$, of such length that its ends project somewhat beyond the side plates of the handle, as shown in Figs. 2 and 4. The projecting ends serve for conveniently taking hold of the cross-head in opening or closing the fan.

The side plates of the forked portion are provided below the lips $a^2$ with notches $a^3$, as shown in Figs. 3 and 4, into which the cross-head enters, so as to allow the end plate, $b'$, of the fan to pass into the space between the side plates as far as the notches will permit.

The cross-head $b^2$ is retained in position at either side of the handle by a double spring-catch, D, or other suitable fastening device, which is secured to the base of the forked portion, as shown in Fig. 1. The bottom of the forked portion of the handle A is downwardly-inclined or rounded off, as shown in Fig. 1, to allow the spring-catch D to be sprung down a little to release the cross-head $b^2$.

For opening the fan, the cross-head is taken hold of with the thumb and finger of one hand, while the spring-catch is pressed down at the same time by the thumb of the other hand, which holds the handle. The end plate of the fan is then swung in a circle around the fixed pivot-pin until the cross-head arrives at the other side of the handle A, it being there pressed into the notches $a^3$ and locked by the spring fastening device D at the other side. The opposite end plate of the fan moves at the same time within the forked portion to the other side thereof until it rests against the other pair of lips, $a^2$. The fan is thus spread out entirely and securely retained in open position. For closing it, the opposite spring-catch is released and the fan folded back within the forked portion or case of the handle, the fan being retained in folded-up state by the cross-head and the fastening device at the other side of the handle.

During the opening and closing of the fan the inner end plate vibrates between the two pairs of lips $a^2$ of the forked portion of the handle without escaping therefrom, while the outer end plate swings around the pivot-pin at the end of the case from one side of the handle to the other and back again.

Having thus described my invention, I claim as new and desire to secure by Letters Patent—

1. The combination of a forked fan-handle with a fan, one end of which is retained within the forked portion, while the other is free to swing from one side to the other of the handle, substantially as described.

2. The combination of a forked fan-handle provided with fastening devices at the base of the forked portion with a fan that is adapted to be locked into open or closed position by the fastening devices, substantially as set forth.

3. The combination, with a forked fan-handle provided with fastening devices at the base and with a pivot-pin at the head of the forked portion, of a fan that is adapted to swing around the pin and be locked by the fastening devices into open or closed position, substantially as specified.

4. The combination of a forked fan-handle having retaining and fastening devices near the base of the forked portion with a fan which is centrally pivoted to the head of the forked portion and provided with end plates, of which one is retained within the forked portion, while the other is adapted to swing in and out of the same and be locked to either side thereof, substantially as set forth.

5. The combination of a forked fan-handle, A, having a double spring-catch, D, with a fan, B, having a cross-head, $b^2$, at the outer end of one of the end plates, substantially as herein shown and described.

6. The lips $a^2$, formed upon the side plates of the forked fan-handle A, to serve as stops for the side bar, $b'$, of the fan B to strike against, substantially as herein shown and described.

7. The notches $a^3$ formed in the forked fan-handle A, to receive the cross-head $b^2$ of the side bar, $b'$, of the fan B, to allow the said side bar to pass in between the side plates of the said fan-handle, substantially as herein shown and described.

8. The combination of a forked fan-handle, A, having inwardly-bent lips $a^2$, with a fan, B, one end plate of which is recessed at both sides to pass clear of the lips, substantially as set forth.

M. RUBIN.

Witnesses:
PAUL GOEPEL,
CARL KARP.